United States Patent Office 2,916,405
Patented Dec. 8, 1959

2,916,405

METHOD OF STERILIZING STARCH GRANULES WITH HYDROGEN PEROXIDE

James W. Evans, Highland, Ind., and Eric M. Van Patten, Harvey, Ill., assignors to American Maize-Products Company, a corporation of Maine No Drawing. Application June 12, 1956
Serial No. 590,826

7 Claims. (Cl. 127—71)

This invention relates to a method of sterilizing starch granules with hydrogen peroxide and in particular to a method of manufacturing sterilized starch granules especially adapted for use in the canning of food products.

The use of hydrogen peroxide for killing thermophile bacteria has previously been suggested and processes have been carefully worked out to minimize the tendency of hydrogen peroxide to change the physical characteristics of the starch. In U.S. Patent No. 2,218,221 the suggestion is made to carry the hydrogen peroxide treatment out at a pH between about 6.8 and 6.9 in order to minimize change in physical characteristics of the starch during treatment. Although this process has been used for over fifteen years it has not proven entirely satisfactory in that pastes made with the treated starch granules thin out and lose viscosity when cooked at pressures exceeding that of the atmosphere. This is particularly objectionable in the canning industry where starch granules are pasted and cooked in sealed cans at pressures substantially above that of the atmosphere and thinning out and loss of viscosity of the paste ends to interfere with modern canning techniques.

We have now discovered that by mixing starch granules with hydrogen peroxide in alkaline environment it is possible with careful control of pH to produce sterilized starch granules which form a paste that has no tendency to thin out and lose viscosity when cooked at pressures substantially above that of the atmosphere as in an autoclave and as brought out in the Examples 6 through 13 (hereinafter described) the autoclave viscosity of the treated starch is in fact greater than the autoclave viscosity of the untreated starch. The process of the present invention is most conveniently carried out and controlled by treating starch granules with hydrogen peroxide in an aqueous slurry to which is added a water soluble alkali to establish the pH of the slurry between 7.6 and 8.5. After the ingredients are thoroughly mixed the starch slurry is dewatered and dried to about 8 to 15% moisture content in conventional manner.

Control of the pH of the slurry is a highly important and critical factor for producing sterilized starch granules which form pastes that show no viscosity reduction on autoclaving. If the starch slurry is adjusted to a pH below 7.6 pastes formed with the treated starch granules will thin out and lose viscosity on autoclaving. On the other hand if the starch slurry is adjusted to a pH above 8.5 the hydrogen peroxide apparently reacts with the starch and the treated granules form a paste upon autoclaving which is too thin for use in canning foods.

Any of the known water soluble alkalies may be employed for adjusting the pH of the starch slurry and we prefer to use strong alkalies such as sodium and potassium hydroxide. Best results are achieved by adding alkali to the slurry before the hydrogen peroxide is added, as this guards against localized overtreatment of starch granules which may occur if strong alkali is added to a slurry containing hydrogen peroxide. Control of pH is best achieved when the starch granules are dispersed in water or other inert liquid carrier since this insures that the environment for the starch granules will be at a uniform pH. Otherwise it would be extremely difficult to achieve starch granules at a uniform pH between 7.6 and 8.5 as specified hereinabove. The amount of starch solids by weight in the slurry may vary but as a practical matter we prefer a slurry containing about 42% by weight of starch solids (dry basis) as this is most conveniently handled with existing plant equipment.

As we now understand it, treatment of the starch with hydrogen peroxide continues throughout the drying operation and as a result there is no set time for holding the starch in aqueous slurry. The only requirement is that the alkali and hydrogen peroxide should be thoroughly mixed and uniformly distributed throughout the slurry. In general we have achieved excellent results by mixing 100,000 pounds of slurry containing 40,000 pounds of starch solids for about ½ to 1½ hours. The temperature of treatment of the starch may vary from room temperature up to a temperature slightly below that at which the starch granules paste. Since our process fits in with normal plant manufacturing operations the starch slurry temperature will ordinarily be about 80° F. to 120° F. and during the drying operation the temperature of the starch will gradually increase to about 190° F. at which time the moisture content of the starch will be down to about 12% by weight of starch. Dewatering and drying the starch slurry is carried out in conventional manner as for example by feeding the starch on a screen or filter cloth having suitable vacuum apparatus for sucking water down through the screen. This may reduce the moisture content of the starch to 30 to 50% by weight of starch and then the wet starch may be fed to a Buell type drier or into ovens and air dried with dehumidified air at a temperature of about 250° F.

Hydrogen peroxide is the most convenient and efficient reagent for carrying out our process and although benzoyl peroxide has some bactericidal properties when used on starch it is not as desirable as hydrogen peroxide. Only very small amounts of hydrogen peroxide are required for carrying out our process. The amount of hydrogen peroxide may be between about 0.05% and 0.6% by weight of starch solids in the slurry (dry basis) and for best results we prefer to use about 0.05% to 0.15% of hydrogen peroxide by weight of starch solids. The hydrogen peroxide may be added to the slurry in any convenient manner depending upon existing plant operation. Any of the known commercial starches may be treated in accordance with the present invention such as rice, tapioca, potato, corn and wheat starches.

The following specific examples are given to further illustrate the details of our invention:

Example 1

The pH of 100,000 pounds of slurry containing 40,000 pounds corn starch granules (dry basis) was adjusted to 7.9 with sodium hydroxide. Three hundred and sixty pounds of a 10% hydrogen peroxide solution were added and the mixture agitated at 110° F. for 1 hour to thoroughly mix the ingredients. The slurry was then dewatered and the treated starch granules dried to about 10% moisture content by weight starch in conventional manner.

Example 2

The pH of 114,300 pounds of slurry containing 40,000 pounds corn starch granules (dry basis) was adjusted to 8.0 with potassium hydroxide. Four hundred pounds of a 10% hydrogen peroxide solution were added and the mixture agitated at a temperature of 95° F. for 1½ hours. The slurry was dewatered and the treated starch granules dried to about 12% moisture content by weight of starch in conventional manner.

Example 3

The pH of 105,300 pounds of slurry containing 40,000 pounds corn starch granules (dry basis) was adjusted to 8.1 with sodium hydroxide solution. Four hundred pounds of a 10% hydrogen peroxide solution were added and the whole agitated at 90° F. for ½ hour. The slurry was dewatered and the treated starch granules dried to about 10% moisture content by weight of starch in conventional manner.

Example 4

The pH of 98,000 pounds of slurry containing 40,108 pounds of corn starch granules (dry basis) was adjusted to 8.2 with sodium hydroxide. Four hundred and forty-two pounds of a 10% solution of hydrogen peroxide were added and the mixture agitated at 105° F. for 1 hour. The slurry was dewatered and the treated starch granules dried to about 12% moisture content by weight of starch in conventional manner.

Example 5

The procedure of Example 4 was followed with the exception that 510 pounds of a 10% hydrogen peroxide solution were added in place of the four hundred and forty-two pounds specified in Example 4.

Starch granules recovered from each of Examples 1 through 5 were tested as follows:

| Example | pH | $H_2O_2$, p.p.m. | Autoclaved Viscosity | Bacteriological |||| 
|---|---|---|---|---|---|---|---|
| | | | | Thermophiles per 10 gm. | Flat Sours per 10 g. | $H_2S$ Producers | Non $H_2S$ Producers |
| Control | (ave.) | 0 | 5.0 | 740 | 700 | 45 | 0 |
| 1 | 7.9 | 900 | 5.4 | 5 | 5 | 0 | 0 |
| 2 | 8.0 | 1,000 | 5.3 | 15 | 15 | 0 | 0 |
| 3 | 8.1 | 1,000 | 5.5 | 5 | 5 | 0 | 0 |
| 4 | 8.2 | 1,100 | 5.4 | 0 | 0 | 0 | 0 |
| 5 | 8.2 | 1,270 | 5.4 | 5 | 5 | 0 | 0 |

The control sample was a composite of samples of untreated starch taken from the corn starch used in Examples 1 through 5. Bacteriological tests were run as described in Q.M.C. Technical Bulletin No. 1 Bacterial Standards for starches, flours, cereals and sugars used in the preparation of canned foods for the U.S. Army, Chicago Q.M.C. Depot (July 30, 1942). In each case of Examples 1 through 5 the bacteriological tests satisfied the standards prescribed by the National Canners Association. The method employed for determining autoclave viscosity was as follows:

Two hundred and thirty-five milliliters of distilled water were added to a No. 2 can and heated to 210° F. on a steam bath. A separate starch slurry was then made up with 8.0 grams of starch in 80 ml. of distilled water which was added and stirred into the contents of the can on the steam bath. When temperature of contents of can reached 195° F. the can was sealed and placed in an autoclave at 15 pounds steam pressure for 45 minutes. The can was then quickly cooled to about 80° F. and allowed to stand 16 to 20 hours at this temperature.

The can was opened and its contents thoroughly mixed and then a 25 ml. sample placed in a Mohr pipette. The Mohr pipette had an orifice adapted to deliver the first ml. of water in 4.1 to 4.2 seconds. Viscosity of starch samples were determined by recording the number of seconds required for the first 10 ml. of starch paste to flow from the pipette. Canners usually specify a minimum outflow time of 5.1 seconds for an acceptable starch product.

Examples 6 through 13

In these examples the procedure, ingredients and proportions of ingredients specified in Example 1 was employed with the exception that pH and amount of hydrogen peroxide was changed as follows:

| Example | pH | $H_2O_2$, p.p.m. (basis starch solids) | Autoclaved Viscosity ||
|---|---|---|---|---|
| | | | Control | Treated Starch |
| 6 | 7.9 | 1,000 | 5.1 | 5.4 |
| 7 | 8.0 | 1,000 | 5.2 | 5.4 |
| 8 | 8.2 | 1,500 | 5.2 | 5.4 |
| 9 | 8.0 | 1,500 | 4.7 | 5.5 |
| 10 | 8.0 | 1,000 | 4.8 | 5.3 |
| 11 | 8.0 | 1,000 | 5.0 | 5.4 |
| 12 | 8.6 | 1,000 | 5.1 | 4.7 |
| 13 | 7.5 | 1,000 | 5.2 | 5.0 |

All of the starch granules recovered in Examples 6 through 13 met the National Canners Association standards for thermophiles.

It will be understood that we intend to cover all changes and modifications of the preferred form of our invention herein chosen for the purpose of illustration which do not constitute a departure from the spirit and scope of our invention.

What we claim is:

1. A process of manufacturing starch granules substantially free of bacteria which comprises the steps of forming an aqueous slurry of starch granules, adding a water soluble alkali to the slurry to adjust the pH to about 7.6 to 8.5, adding hydrogen peroxide in an amount of about 0.05% to 0.6% of the dry weight of starch and then drying the starch slurry while maintaining the starch at a temperature slightly below the pasting point of the starch to produce starch granules substantially free of bacteria which form a paste that shows no reduction in viscosity on autoclaving below that of untreated starch granules of the same general type.

2. A process as specified in claim 1 which includes the step of drying the starch to a moisture content of about 8% to 15% by weight of starch.

3. A process as specified in claim 1 which includes the step of maintaining the starch granules at a temperature below about 190° F. to prevent pasting of the starch granules.

4. A method as specified in claim 1 in which the starch slurry contains no more than about 44% by weight of starch solids.

5. Starch granules substantially free of bacteria having an autoclave viscosity of about 5.1 prepared in accordance with the process of claim 1.

6. A process of treating starch to form granules substantially free of bacteria which comprises the steps of dispersing corn starch granules in a slurry, adding alkali to the slurry to bring the pH within the range of about 7.6 to 8.5, adding hydrogen peroxide to the slurry in an amount of about 0.05% to 0.6% of the weight of starch solids in the slurry and then drying the slurry while maintaining the starch at a temperature slightly below the pasting point of the starch to produce starch granules substantially free of bacteria which when pasted have an autoclave viscosity of not less than 5.1 seconds.

7. In the treatment of corn starch granules with hydrogen peroxide which includes drying the starch granules after treatment to produce a product substantially free of bacteria, the method which comprises the step of treating the starch with hydrogen peroxide in aqueous slurry at a pH of about 7.6 to 8.5 to produce starch in granular form which when pasted has an autoclave viscosity of not less than 5.1 seconds.

References Cited in the file of this patent

UNITED STATES PATENTS

| | | |
|---|---|---|
| 2,052,320 | Sjostrom | Aug. 25, 1936 |
| 2,218,221 | Schopmeyer | Oct. 15, 1940 |
| 2,291,041 | Kauffmann | July 28, 1942 |
| 2,347,849 | Seiberlich | May 2, 1944 |